3,801,484
FIXATION OF NITROGEN TO FORM NITRATES
Everett R. Johnson, Chevy Chase, and Earl W. Holtzcheiter, Jr., College Park, Md., assignors to the United States of America as represented by the United States Atomic Energy Commission
No Drawing. Filed Oct. 13, 1972, Ser. No. 297,560
Int. Cl. B01j 1/10
U.S. Cl. 204—157.1 H                6 Claims

ABSTRACT OF THE DISCLOSURE

A method of forming a nitrate or nitrite by contacting a mixture of nitrogen and oxygen with a perbromate, bromate, bromite or hypobromite in the presence of ionizing radiation.

BACKGROUND OF THE INVENTION

This invention was made in the course of, or under, a contract with the United States Atomic Energy Commission.

In view of the importance of nitrates and nitrites in industry and in the laboratory, new methods of making these compounds are being sought including methods using radiation. Previous work has shown that nitrate is formed when a bromide is irradiated in the presence of air. The yield is low, however.

SUMMARY OF THE INVENTION

It is accordingly one object of our invention to provide a method of forming nitrites and nitrates from nitrogen and oxygen.

Other objects of our invention will become apparent from the following description.

We have discovered that nitrate and nitrite are formed when solid perbromates, bromates, bromites or hypobromites are irradiated in the presence of nitrogen and oxygen, and have thus provided a method of making nitrates and nitrites which could be used for normal industrial purposes, and in view of its feasibility to small scale use, is especially useful for producing these compounds enriched in specific isotopes of either oxygen or nitrogen or both.

In carrying out our invention a gaseous mixture of nitrogen and oxygen is contacted with a solid bromine compound and irradiated. The compound of bromine may be any of the salts of the perbromates, bromates, bromites and hypobromites, and the alkali metal salts of the bromates are preferred. The form of the solids is not critical, but they are preferably in a finely divided state.

The ratio of nitrogen to oxygen is not critical and the ratio of these compounds in air is suitable. For cost considerations, air is therefore preferred as a source of the mixture.

Any ionizing radiation such as alpha, beta, and X-rays may be used in our process, but gamma radiation is preferred. The source of radiation may be a radioactive element such as cobalt-60, or radiation from a particle accelerator or nuclear reactor may be used.

Neither temperature nor pressure is critical and the reaction is preferably carried out at 20 to 30° C. and at atmospheric temperature.

The mechanism of the reaction is not known, but the nitrogen is fixed as the nitrate and nitrite which are incorporated into the matrix of the bromine-containing compound. In the case of bromate the bromate is almost completely decomposed forming bromide at an irradiation dose at $5 \times 10^{23}$ electron volts per gram.

The following example is offered to illustrate our invention in more detail.

EXAMPLE

A 1 gram mass of 100 mesh potassium bromate was irradiated with a cobalt-60 source in the presence of air at a temperature of 25° C. and a pressure of 1 atmosphere to a dose of $5 \times 10^{23}$ electron volts per gram.

Analysis of the reaction products showed the following compounds in the amount set forth.

| Products: | Mol percent |
|---|---|
| $KNO_3$ | 15 |
| $KNO_2$ | 4 |

Other products, such as bromides, bromine, and oxybromides, were also formed.

The foregoing example is given to illustrate, not to restrict, our invention which should be limited only in accordance with the following claims.

What is claimed is:

1. A method of making a nitrogen and oxygen-containing compound from a gaseous mixture of oxygen and nitrogen comprising contacting said gaseous mixture with a bromine-containing compound selected from the group consisting of perbromates, bromates, bromites, and hypobromites in the presence of ionizing gamma radiation.

2. The method of claim 1 wherein said gaseous mixture is air.

3. The method of claim 1 wherein said bromine-containing compound is an alkali metal compound.

4. The method of claim 3 wherein said alkali metal is potassium.

5. The method of claim 1 wherein said bromine-containing compound is potassium bromate.

6. The method of claim 1 wherein the bromine-containing compound is irradiated to a level of at least $5 \times 10^{23}$ electron volts per gram.

References Cited

UNITED STATES PATENTS 2,898,277    8/1959    Harteck et al. ___ 204—157.1 H

HOWARD S. WILLIAMS, Primary Examiner